United States Patent  [15] 3,661,181
Palmer et al.  [45] May 9, 1972

[54] LIP SEALING MIXING VALVE FOR LAVATORIES, SINKS, ETC.

[72] Inventors: Patsy B. Palmer, Granada Hills; Julius L. Tolnai, Los Angeles, both of Calif.

[73] Assignee: Price-Pfister Brass Mfg. Co., Pacoima, Calif.

[22] Filed: Dec. 7, 1970

[21] Appl. No.: 95,506

[52] U.S. Cl. .......................................... 137/625.17, 251/175
[51] Int. Cl. .................................................. F16k 19/00
[58] Field of Search ............... 137/625.17, 636.4; 251/172, 251/175

[56]  References Cited

UNITED STATES PATENTS

| 2,949,933 | 8/1960 | Moen | 137/625.17 |
| 3,169,549 | 2/1965 | Quick | 137/625.17 |
| 3,378,034 | 4/1968 | Andrews | 137/625.17 |
| 3,542,072 | 11/1970 | Harris | 251/172 X |

FOREIGN PATENTS OR APPLICATIONS 794,665  5/1958  Great Britain ............ 137/625.17

*Primary Examiner*—William R. Cline
*Attorney*—Flam and Flam

[57]  ABSTRACT

This invention relates to a single-handled valve for controlling both combined volume and relative proportion of hot and cold water. A control valve stem extends through a moldable sleeve-like sealing member, the sleeve-like sealing member cooperating with hot and cold water inlet openings. The axial and angular positions of the stem determine the combined volume and relative proportion while the sleeve-like sealing member performs all of the sealing functions between the inlet openings and the valve outlet.

9 Claims, 23 Drawing Figures

PATENTED MAY 9 1972

INVENTORS.
PATSY B. PALMER
JULIUS L. TOLNAI
BY Flam and Flam
ATTORNEYS.

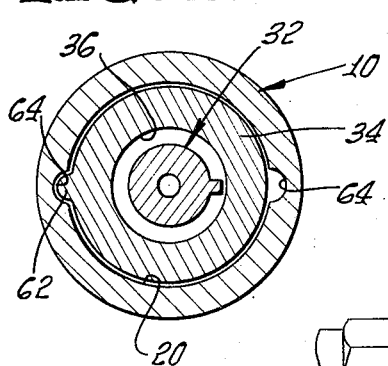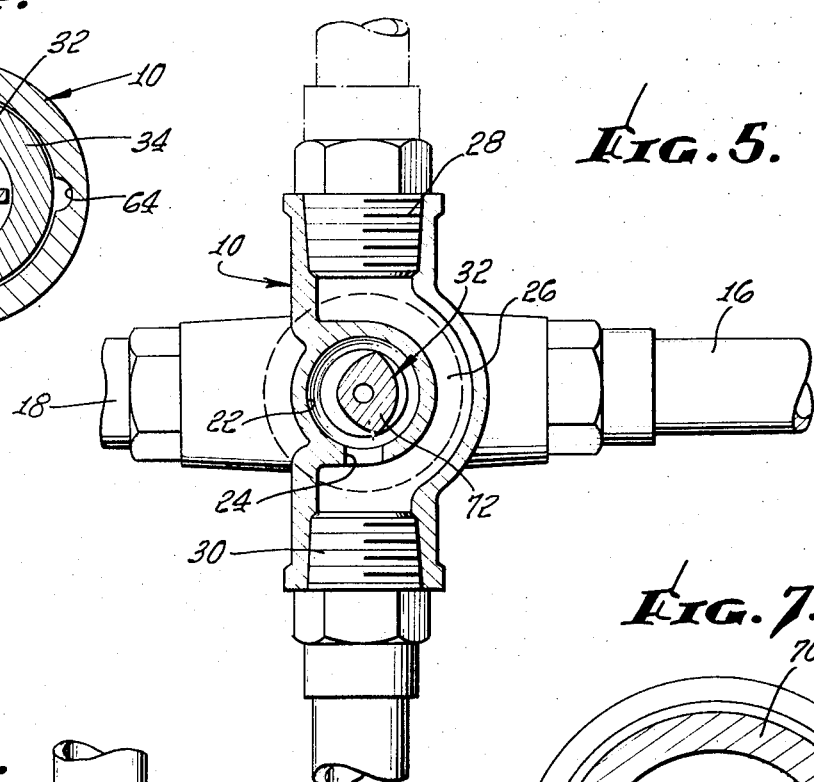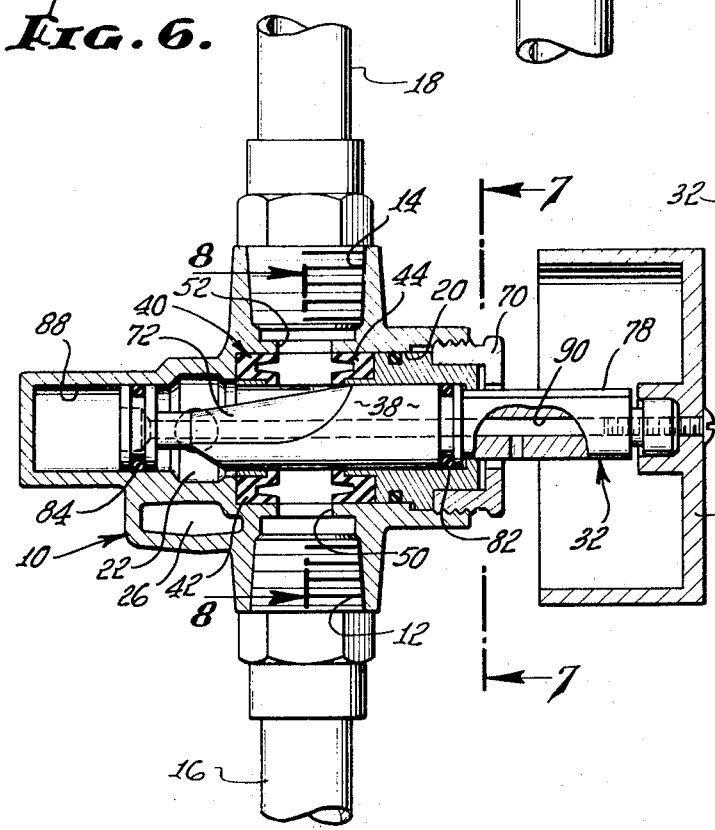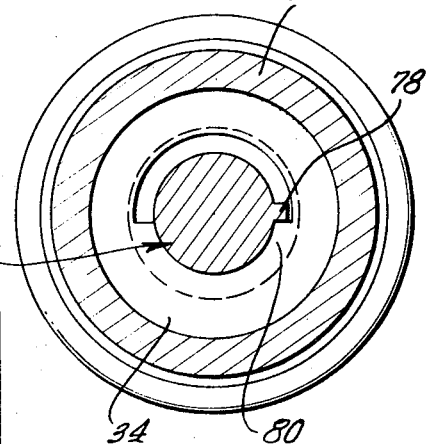

INVENTORS.
PATSY B. PALMER
JULIUS L. TOLNAI

By
Flam and Flam
ATTORNEYS.

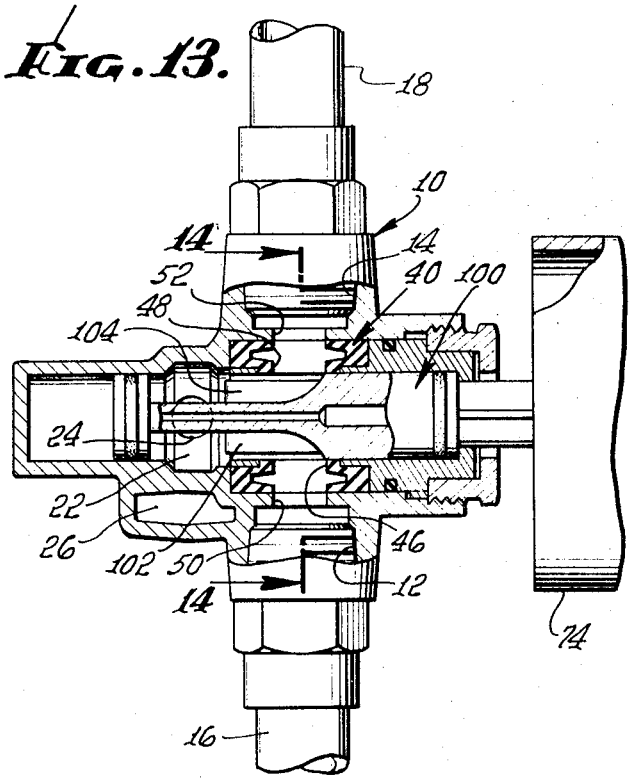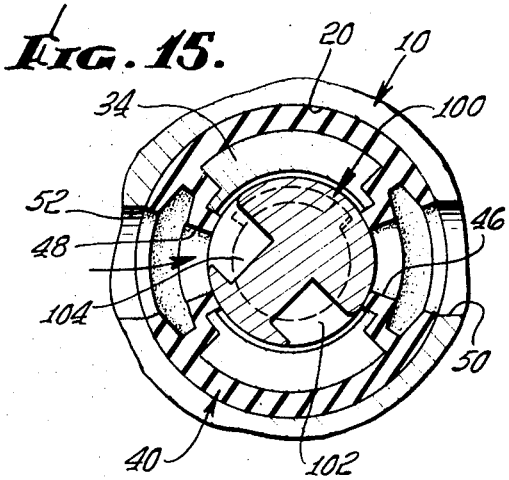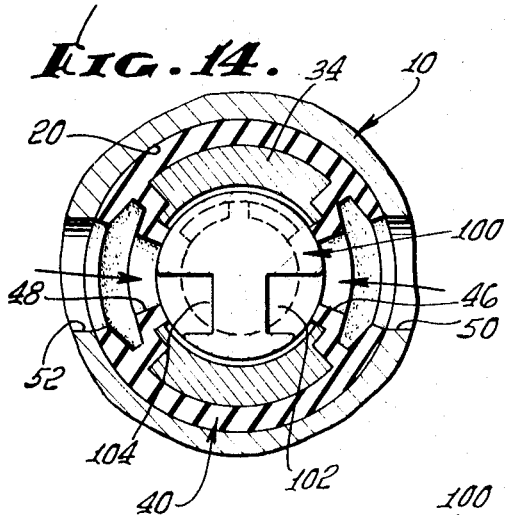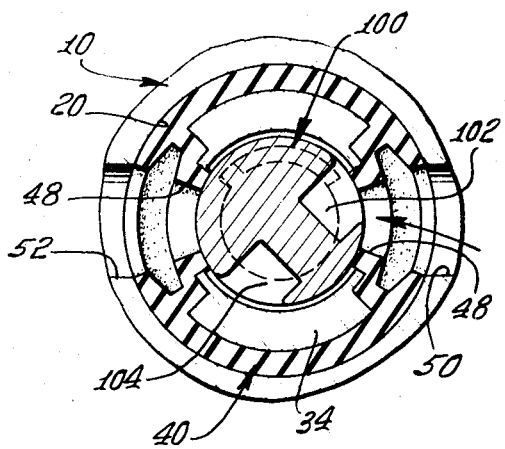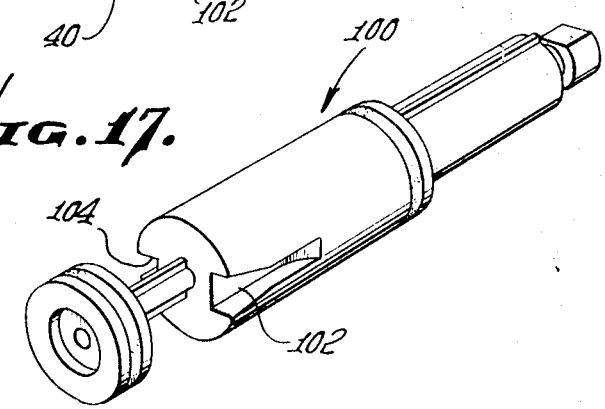

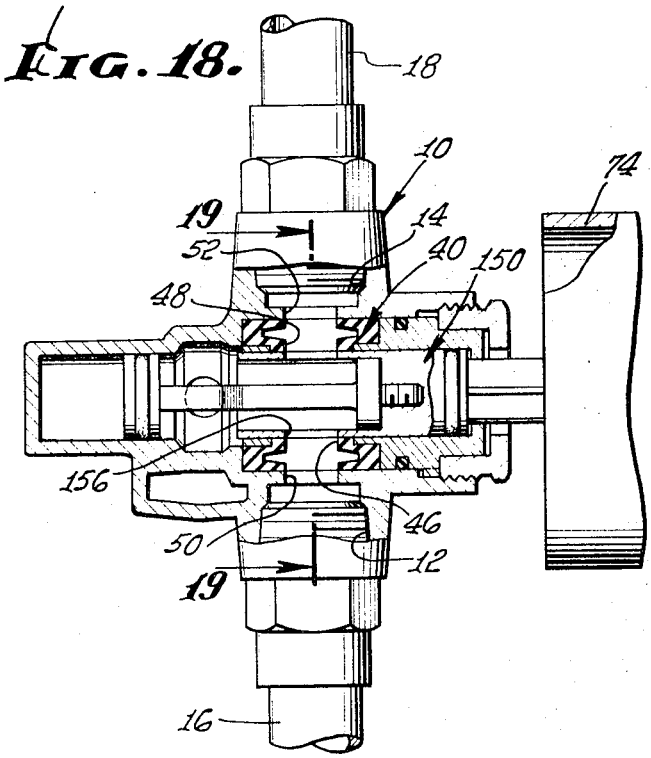
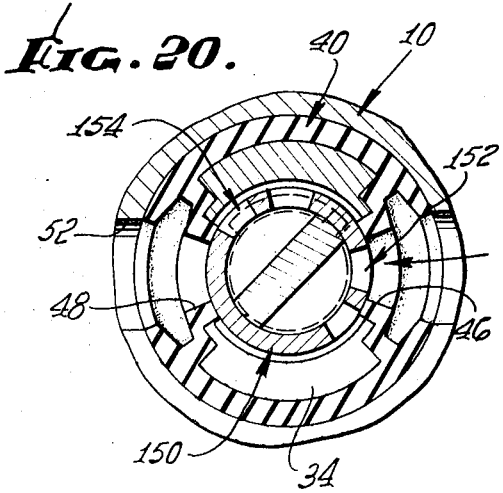
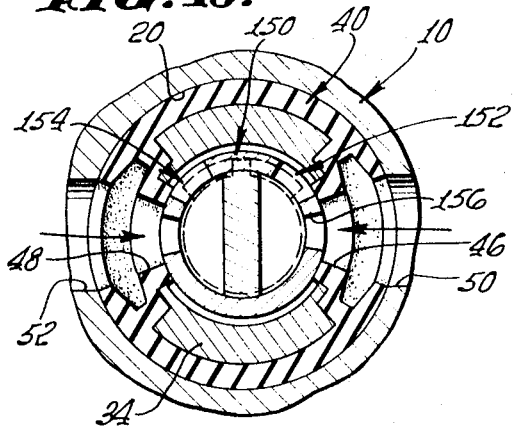
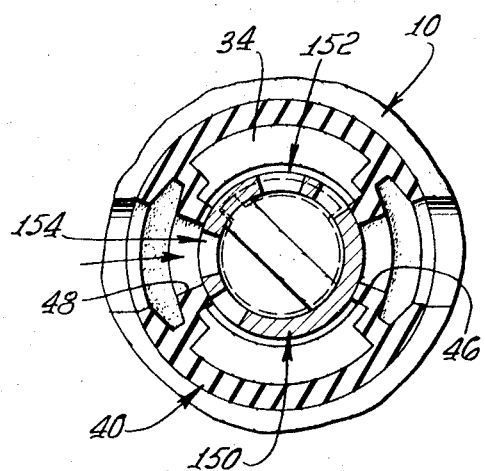
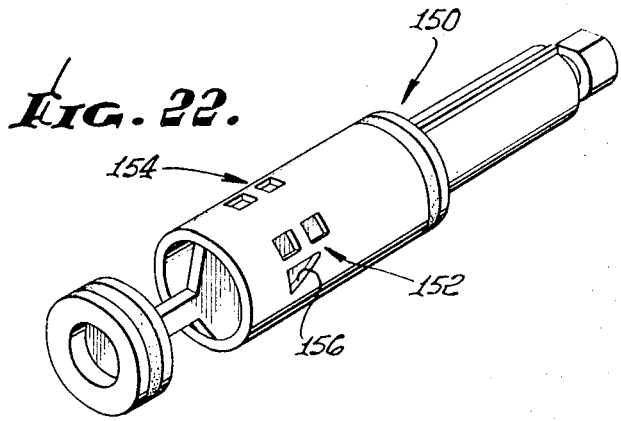
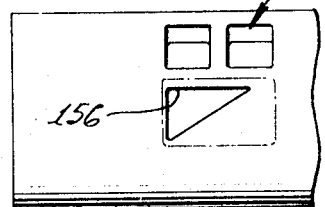

3,661,181

LIP SEALING MIXING VALVE FOR LAVATORIES, SINKS, ETC.

FIELD OF INVENTION

This invention relates to single-handled valves for controlling both combined volume and relative proportion of hot and cold water such as for a tub, shower or a combined tub and shower. Various classes of such valves have been devised. One widely accepted class utilizes a valve control member movable axially to determine combined flow and angularly to determine relative proportion.

BACKGROUND OF THE INVENTION

Mixing valves having the axial-angular or cylindrical coordinate modes of movement very often require complex seal structures. Some efforts have been made to provide simpler seal structures for valves of this class. One known valve utilizes a flexible cup that fits into a valve chamber so as to overlie diametrically disposed hot and cold water inlets. A valve stem fits into the cup and in the closed position of the valve presses the cup into sealing contact with the inlets. The stem, however, is relieved so that as the stem is moved axially outwardly, the cut, under the influence of line pressure, flexes radially inwardly to an extent determined by the degree of proximity of the stem surface. By suitable design of the stem surface, angular position and axial position determine proportion and volume.

While this known valve structure is quite simple in terms of essential structure and in terms of replacement of parts, the seal has certain undesirable characteristics. Thus the line pressure opposes the establishment of a seal whereby large forces must be imposed on the flexible cup at the regions of the inlet openings. This reduces the life of the seal member.

The primary object of this invention is to provide a mixing valve structure of the cylindrical coordinate class in which a single seal element performs all of the dynamic and static seal functions in such manner that line pressure assists in the establishment of the seals.

SUMMARY OF THE INVENTION

In order to accomplish the foregoing object, we provide a sleeve-like seal member through which a valve control stem extends, the seal member forming atria for the hot and cold water ports, each atrium being flexed under the influence of line pressure to assist in providing a seal when the control stem is positioned to close the corresponding atrium.

BRIEF DESCRIPTION OF THE DRAWINGS

A detailed description of the invention will be made with reference to the accompanying drawings. These drawings, unless described as diagrammatic or unless otherise indicated, are to scale.

FIG. 4 is a transverse sectional view taken along a plane indicated by line 4—4 of FIG. 3, and showing the manner in which the valve cage is held against angular movement.

FIG. 5 is a vertical sectional view taken along a plane indicated by line 5—5 of FIG. 1, and showing the location and manner of interconnection of the tub and shower fittings.

FIG. 6 is a sectional view similar to FIG. 3 but showing the valve open.

FIG. 7 is an enlarged transverse sectional view showing the manner in which limits are imposed upon angular movement of the valve stem.

FIG. 13 is a sectional view similar to FIG. 6 but showing a modified valve stem.

FIGS. 14, 15 and 16 are enlarged transverse sectional views taken along a plane corresponding to line 14—14 of FIG. 13, and showing different positions of the valve stem.

FIG. 17 is an isometric view of the valve stem incorporated in the valve of FIG. 13.

FIG. 18 is a sectional view similar to FIG. 6, but showing a still further modified form of the valve stem.

FIGS. 19, 20 and 21 are enlarged transverse sectional views taken along planes corresponding to line 19—19 of FIG. 18, and showing different positions of the valve stem.

FIG. 22 is an isometric view of the valve stem incorporated in the valve of FIG. 18.

FIG. 23 is an enlarged fragmentary side elevational view of the valve stem.

DETAILED DESCRIPTION

The following detailed description is of the best presently contemplated modes of carrying out the invention. This description is not to be taken in a limiting sense but is made merely for the purpose of illustrating the general principles of the invention since the scope of the invention is best defined by the appended claims.

Structural and operational characteristics attributed to forms of the invention first described shall also be attributed to forms later described unless such characteristics are obviously inapplicable or unless specific exception is made.

Figure 3:
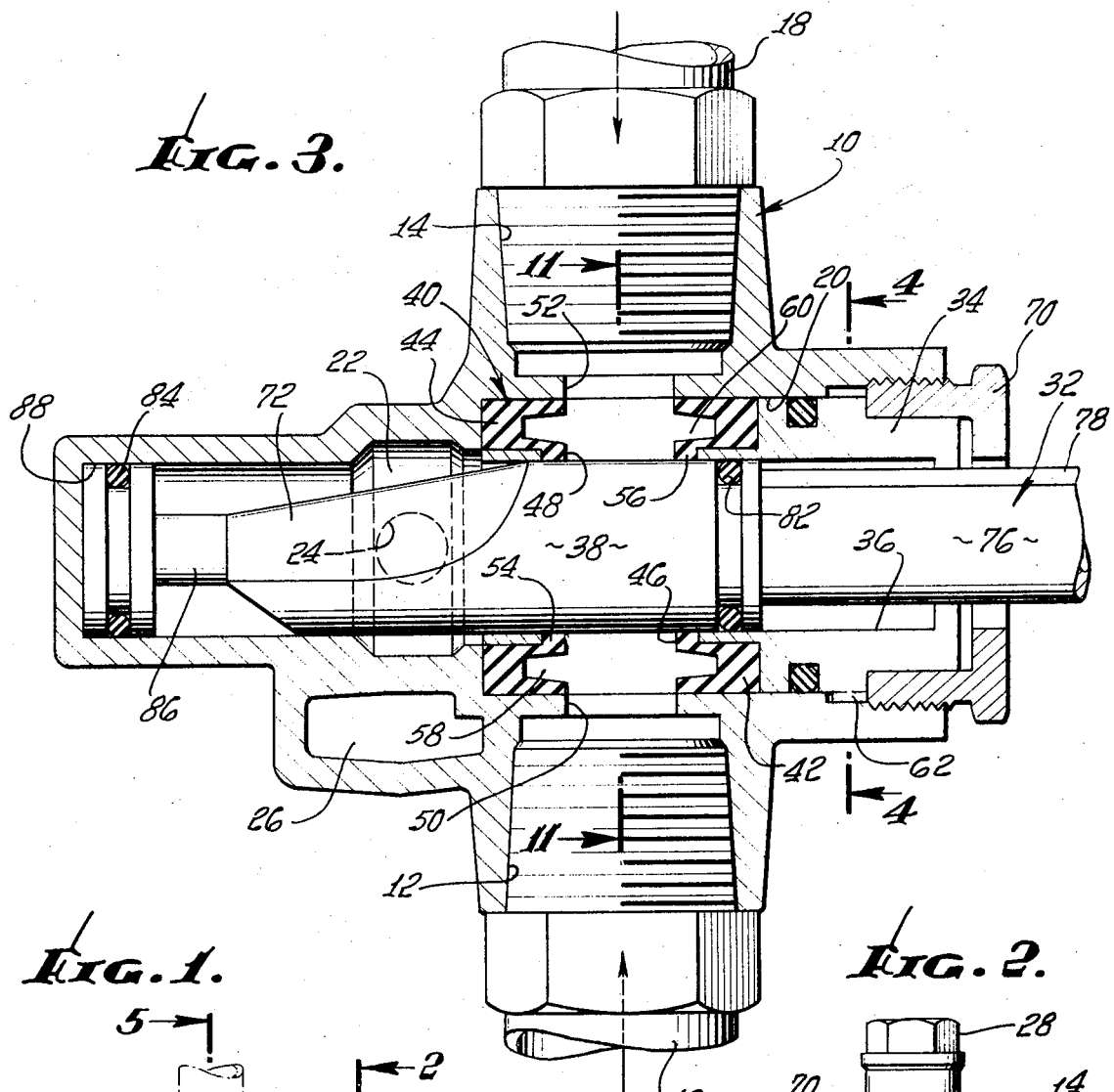
FIG. 3 is an enlarged axial sectional view taken along a plane corresponding to line 3—3 of FIG. 1, and showing the assembled relationship of valve parts.
Figure 1:
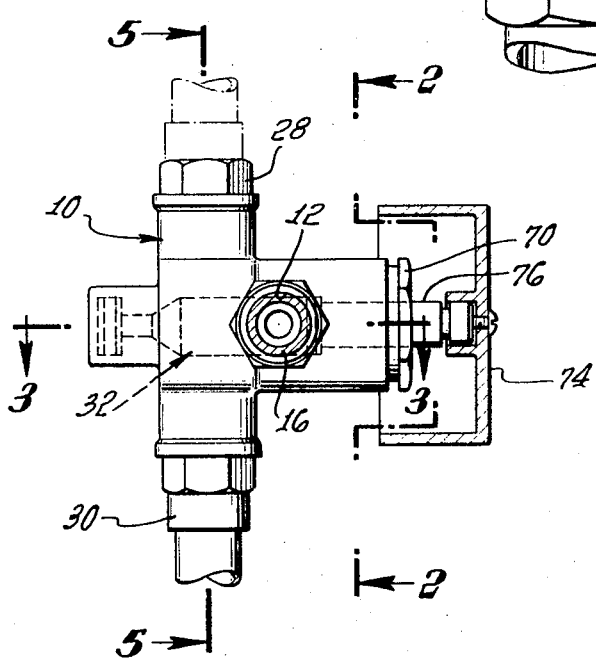
FIG. 1 is a side elevational view of a valve structure incorporating the present invention, the valve stem being shown in phantom lines, and the handle and one of the supply pipes being shown in section.
Figure 2:
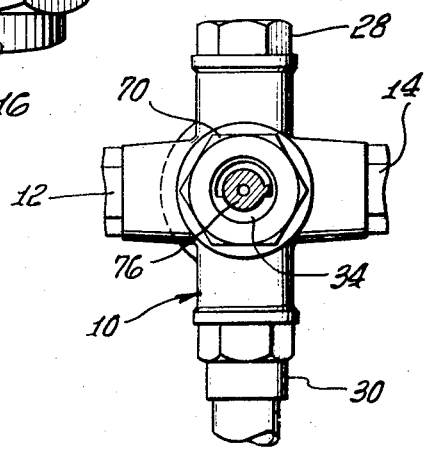
FIG. 2 is a sectional view taken along the offset plane indicated by line 2—2 of FIG. 1, and showing the orientation of fittings for the supply and discharge pipes.
Figure 8:
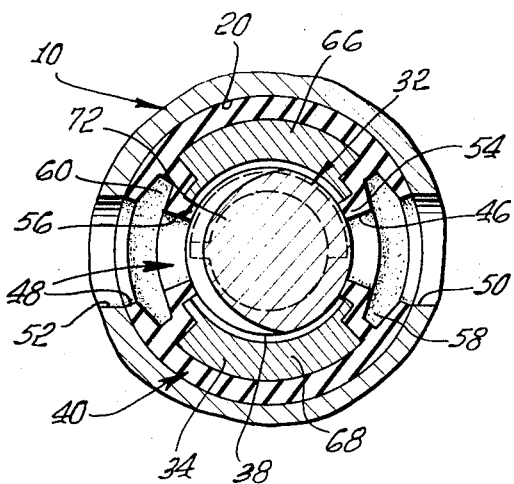
FIGS. 8, 9, 10 and 11 are enlarged fragmentary sectional views taken along a plane corresponding to line 8—8 of FIG. 6, and showing various valve positions, the valve stem being positioned to admit cold water in FIG. 8, to admit both cold and hot water in FIG. 9, to admit hot water in FIG. 10, and to close the valve in FIG. 11.
Figure 9:
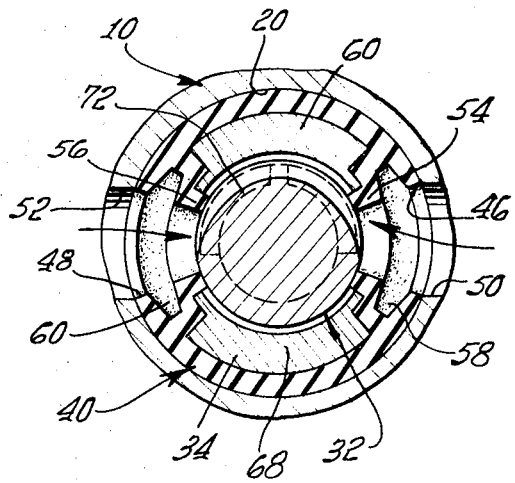
Figure 10:
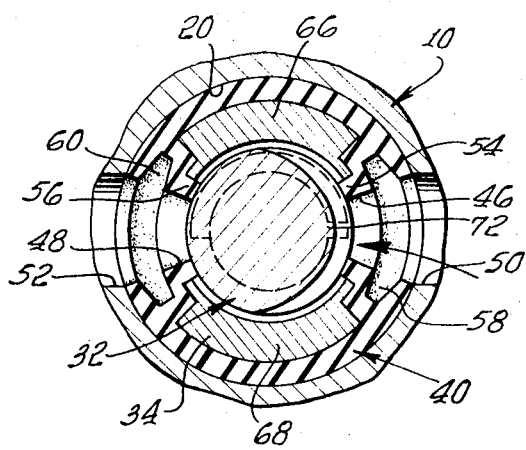
Figure 11:
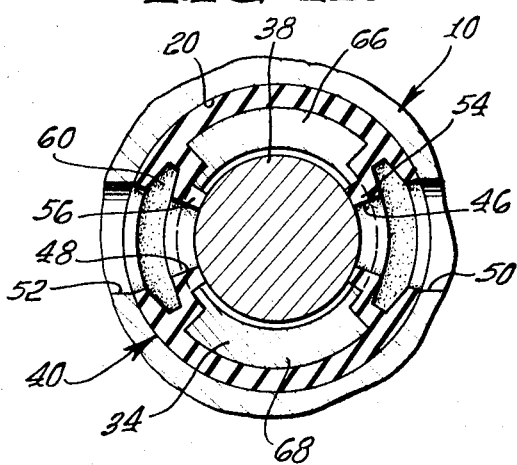

The valve structure shown in FIGS. 1 to 12 includes a body 10 having interiorly threaded openings 12 and 14 on opposite sides (FIGS. 2 and 5) for connection of hot and cold water lines 16 and 18. Water entering the body 10 through the inlet openings 12 and 14 is conducted to the opposite sides of a generally cylindrical valve chamber 20 (FIG. 3). The inner end of the chamber 20 opens into a receiving chamber 22 (see also FIG. 5). Water from the receiving chamber 22 is conducted via port 24 to a surrounding arcuate outlet chamber 26 that connects with top and bottom outlet fittings 28 and 30. If only one outlet fixture is used, one of the fittings is plugged.

Water entering the valve chamber 20 is permitted to pass to the outlet chamber 26 in accordance with the axial and angular position of a valve stem 32. The valve stem 32 is surrounded and supported by a bonnet or cage 34. The cage fits into the valve chamber 20, and the stem in turn fits a cylindrical bore 36 of the cage. Only the central cylindrical portion 38 of the stem 32 actually fits the cage bore.

Figure 12:
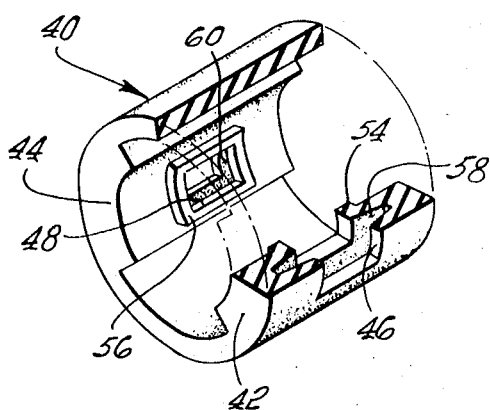
FIG. 12 is an isometric view of the valve sleeve, a portion of the sleeve being broken away and shown in section.

A sleeve-like flexible sealing member 40 (see also FIG. 12) provides the requisite static seals for confining flow from the inlet openings to the valve stem. The sealing member also provides the requisite dynamic seals operable in the closed position of the valve to cut off flow at the valve stem. The member 40 is made of flexible resilient material such as neoprene, and is mounted upon the reduced inner end of the cage 34 so as to be located in line with the hot and cold water inlets 12 and 14. As shown in FIG. 12, the outer surface of the sealing member 40 is substantially cylindrical to fit the bottom of the valve chamber 20.

The sealing member 40 has thick wall parts 42 and 44 on opposite sides. These wall parts have ports 46 and 48 the outer ends of which register with reduced hot and cold water ports 50 and 52 at the inner ends of the openings 12 and 14.

The inner ends of the ports 46 and 48 have edges flush with the cage bore 36 in order to cooperate with the exterior surface of the stem. For this purpose, the wall parts 42 and 44 have bosses 54 and 56 interfitting corresponding apertures formed in the reduced inner end of the cage 34.

The sealing member 40 expands under the influence of line pressure in order to achieve effective seals. For this purpose, atria or ante chambers 58 and 60 are formed in the wall parts 42 and 44 by intermediate enlarged portions of the ports 46 and 48. The atria 58 and 60 divide the thick wall parts 42 and 44 into thin lip parts respectively on the outside and on the inside of the sealing member 40. The outside lips contact the edges about the corresponding body inlet openings 50 and 52 and are urged outwardly under the influence of line pressure resulting from water entering the corresponding atria behind the lips. The inner lips are urged inwardly under the influence of line pressure entering the corresponding atria behind the lips.

When the cylindrical portion 38 of the valve stem is aligned with the sealing member, the lips are stressed to provide an effective seal. The flexing of the inner lips is limited by virtue of the support provided by the cage at the region of the embossments 54 and 56.

The ports 46 and 48 of the sealing member 40 are located to register with the body ports 50 and 52. For this purpose, the cage itself is located by the aid of an ear 62 (see also FIG. 4) that engages either one of two diametrically opposite slots 64 in the valve chamber 20. The sealing member 40 is located on the cage by the interfit of the bosses 54 and 56. In order to relieve the bosses of stress that might be imposed upon them by turning of the cage 36, the sealing member 40 is also keyed to the cage by fitting thickened portions 66 and 68 of the cage (FIG. 8) located between the thick wall parts 42 and 44. A nut 70 clamps the cage against the bottom of the valve chamber 20.

In order to open the ports 46 and 48, the valve stem 32 is moved outwardly of the chamber 20 to bring a relieved portion 72 thereof into operative position opposite the ports 46 and 48. This allows water to flow along the outside of the stem to the collection chamber 22. The sealing member is prevented from extreme flexure by its supporting cage. Yet the cage allows some flexure. The relieved portion 72 is tapered. Thus as the stem is moved outwardly, a larger effective flow channel is provided. The relieved portion 72 extends only part way around the circumference of the stem. Accordingly, angular movement of the stem from a neutral position reduces the size of the flow channel for one of the ports while the size of the flow channel for the other is increased. By judiciously controlling the configuration of the relieved portion 72, desired flow characteristics of the valve are determined.

In order to move the valve stem, a handle 74 is provided. The handle is secured in a conventional manner to a reduced end 76 of the stem. The reduced stem end has a ridge 78 (see FIG. 7) that cooperates with ends of an interior arcuate flange 80 formed at the outer end of the cage 34.

The water passing from the sealing member ports 46 and 48 along the exterior of the stem 38 is prevented from flowing outwardly by the aid of an O-ring 82 carried by the stem 32. Another O-ring 84, carried upon an inward extension 86 of the stem, defines, with a cylindrical recess 88 of the body, a pressure equalization chamber. The cylindrical recess 88 in which the O-ring 84 works is the same size as the bore 36 in which the sealing O-ring 82 works. By venting the recess 88 beyond the O-ring 84, it is ensured that the water pressure acting on the stem is longitudinally balanced. In order to vent the recess, the valve stem has an axial bore 90 (FIG. 6). The vent opens frontally to ensure against undetected leakage into the wall should the O-ring 84 fail.

In the form shown in FIG. 13, all of the components are the same, including the sealing member 40. In the present instance, the valve stem 100 has a pair of shear slots 102 and 104 registrable with the sealing member openings 46 and 48. The slots 102 and 104 widen toward the inner end of the stem 100 in order to provide a flow characteristic whereby flow increases as the stem is moved outwardly. The center-to-center spacing between the slots 102 and 104 along the exterior of the stem 100 is different from the corresponding spacing of the inlet ports 46 and 48 whereby angular movement of the stem from the position of FIG. 14 causes one of the slots to decrease registry with its port while the other increases registry with its port. The valve stem 100, as in the previous form, has a cylindrical exterior surface 100 cooperable with the inner lips of the sealing member 40 to provide an adequate seal arrangement when the stem is moved inwardly.

In the form shown in FIG. 18, the stem 150 is hollow and is provided with two sets of control apertures 152 and 154 registrable with the sealing member openings 46 and 48. The sets of control openings 152 and 154 are located so as to change the effective opening of the seal member inlets in accordance with the angular and axial position of the stem. One aperture of each set, as for example the aperture 156, has a slanted edge in order to provide not only sensitive control at low-volume positions, but also a slow-changing-volume characteristic near the OFF position to minimize noise.

We claim:

1. In a mixing valve structure:
   a. a valve body having means forming a valve chamber;
   b. means forming hot and cold water inlets opening into the chamber at spaced side locations thereof;
   c. a valve stem extending into said chamber and having a substantially cylindrical exterior surface portion movable to oppose said inlet openings;
   d. a sleeve-like sealing member made of flexible material surrounding said valve stem and held in place in said valve recess to overlie said inlet openings;
   e. said sealing member having interior surfaces slidingly fitting said valve stem;
   f. said sealing member having a pair of ports respectively establishing communication between said inlets and said interior surface portions, said ports having intermediate enlargements forming atria subjected to supply inlet pressure to expand said sealing member into sealing engagement with said inlet openings and into sealing engagement with said cylindrical surface portions;
   g. said valve stem having flow channel means adjoining said cylindrical surface portion to control flow into said valve chamber from said inlet openings in accordance with the angular and axial positions of said valve stem;
   h. said sealing member forming the only operable static and dynamic seals between said inlet openings and the exterior surface of said valve stem.

2. The mixing valve as set forth in claim 1 in which said valve stem has flow channel means on its exterior surface adjoining said cylindrical surface portions; said mixing valve structure including a cage-like support for said sealing member limiting the flexure of said sealing member toward said stem when said flow channel means are opposed to said sealing member ports.

3. The mixing valve as set forth in claim 1 in which said valve stem is hollow, said valve stem having flow controlling apertures adjoining said cylindrical surface portions.

4. In a mixing valve structure:
   a. a valve body having a substantially cylindrical recess forming a valve chamber;
   b. said body having hot and cold water inlets opening into said recess on opposite sides thereof;
   c. means forming an outlet at the bottom of said valve chamber;
   d. a bonnet fitted into the valve chamber and having a substantially cylindrical bore part;
   e. a substantially sleeve-like sealing member made of flexible material and supported on a reduced portion of the bonnet, said sealing member having wall parts opposed to said hot and cold water inlets;
   f. a valve stem having a cylindrical portion slidably accommodated in the cylindrical part of said bonnet bore part;
   g. interior surface portions of said wall parts being located to be slidably engaged by said cylindrical portion of said stem;
   h. said sealing member having a pair of ports respectively establishing communication between said inlets and said interior surface portions;

i. each sealing member port having an enlarged atrium forming sealing lips at the outer portion of said sealing member and at the corresponding interior surface portion operable to establish seals under the influence of line pressure both with said valve body inlets on the outside of said sealing member and with said exterior cylindrical surface portion of said stem on the inside of said sealing member;

j. said valve stem having flow channel means adjoining said cylindrical surface portion to control flow into said valve chamber from said inlet openings in accordance with the angular and axial positions of said valve stem;

k. said sealing member forming the only operable static and dynamic seals between said inlet openings and the exterior surface of said valve stem.

5. The mixing valve as set forth in claim 4 in which said sealing member has embossments forming said interior surface portions, said embossments extending through corresponding apertures in said supporting bonnet.

6. The mixing valve as set forth in claim 4 in which said valve stem has flow channel means on its exterior surface adjoining said cylindrical surface portions; said sealing member having embossments forming its said interior surface portions, said embossments extending through corresponding apertures formed in said supporting bonnet; the walls of said bonnet at the regions of said bosses allowing only limited flexure of said sealing member.

7. The mixing valve as set forth in claim 6 in which said flow channel means of said stem are located inwardly of the stem relative to said cylindrical surface portion; said body having a receiving chamber communicating with an outlet, said receiving chamber surrounding said flow channel means when said stem is in valve closing position.

8. The mixing valve as set forth in claim 7 in which said valve body has a pressure balancing chamber located beyond said receiving chamber; said stem having at its inner end, a piston slidable in said pressure balancing chamber; said stem having an axial vent opening at one end in said pressure balancing chamber and opening at the other end frontally of the valve chamber; said pressure balancing chamber having a size substantially equal to the size of said cylindrical part of said bonnet bore.

9. The mixing valve as set forth in claim 4 in which said bonnet is keyed to said valve body to determine an angular orientation with respect to said body, said sealing member being interlocked by said bonnet to determine an angular orientation of said sealing member with respect to said bonnet.

* * * * *